United States Patent
Jin et al.

(10) Patent No.: US 11,533,696 B2
(45) Date of Patent: Dec. 20, 2022

(54) METHOD AND APPARATUS FOR REDUCING CO-CHANNEL INTERFERENCE, AND BASE STATION

(71) Applicant: HUAWEI TECHNOLOGIES CO., LTD., Shenzhen (CN)

(72) Inventors: Lei Jin, Xi'an (CN); Honggang Wang, Shenzhen (CN); Qi Li, Xi'an (CN); Hua Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 17/169,407

(22) Filed: Feb. 6, 2021

(65) Prior Publication Data

US 2021/0160806 A1    May 27, 2021

Related U.S. Application Data

(63) Continuation of application No. PCT/CN2018/098941, filed on Aug. 6, 2018.

(51) Int. Cl.
*H04W 56/00*       (2009.01)

(52) U.S. Cl.
CPC ............................... *H04W 56/0045* (2013.01)

(58) Field of Classification Search
CPC ........... H04W 56/004; H04W 56/0045; H04W 56/005; H04W 56/00
USPC .......................................................... 370/35
See application file for complete search history.

(56) References Cited

U.S. PATENT DOCUMENTS

| | | | |
|---|---|---|---|
| 2011/0090808 A1* | 4/2011 | Chen ..................... | H04W 28/18 370/252 |
| 2011/0170436 A1* | 7/2011 | Doan ..................... | H04B 7/155 370/252 |
| 2011/0222428 A1* | 9/2011 | Charbit ................ | H04B 7/2606 370/252 |
| 2012/0269113 A1* | 10/2012 | Park ..................... | H04B 7/2656 370/315 |
| 2013/0223402 A1* | 8/2013 | Feng ....................... | H04L 5/001 370/336 |
| 2014/0010143 A1* | 1/2014 | Barrett ............... | H04B 7/15592 370/312 |

(Continued)

FOREIGN PATENT DOCUMENTS

CN    101262691 A    9/2008
CN    101932037 A    12/2010

(Continued)

OTHER PUBLICATIONS

3GPP TSG-RAN WG1 Meeting #60,R1-101444,Timing alignment of UL backhaul,Nokia, Nokia Siemens Networks, San Fransisco, USA, Feb. 26, 2022,total 5 pages.

(Continued)

*Primary Examiner* — Nathan S Taylor (57) ABSTRACT

Embodiments of this application provide a method and an apparatus for reducing co-channel interference, and a base station. The method includes: receiving, by a relay eNodeB ReNB, a propagation delay sent by a donor eNodeB DeNB, where the propagation delay is a delay of propagation between the DeNB and the ReNB; and adjusting, based on the propagation delay, timing parameters for sending uplink (Continued)

data and receiving downlink data by the ReNB, where the timing parameters are delays of the ReNB relative to the DeNB. The DeNB is used as a reference for the propagation delay between the DeNB and the ReNB, to delay timing of receiving the downlink data by the ReNB; and advance timing of sending the uplink data by the ReNB.

10 Claims, 7 Drawing Sheets

(56) References Cited

U.S. PATENT DOCUMENTS

| | | | | |
|---|---|---|---|---|
| 2014/0200016 A1* | 7/2014 | Siomina | ............... | H04W 28/20 |
| | | | | 455/450 |
| 2014/0211677 A1* | 7/2014 | Barbieri | ........... | H04W 52/0229 |
| | | | | 370/329 |
| 2014/0376457 A1* | 12/2014 | Feng | .................... | H04J 11/0079 |
| | | | | 370/329 |
| 2015/0117362 A1* | 4/2015 | Luo | .................... | H04W 72/121 |
| | | | | 370/329 |
| 2016/0277081 A1* | 9/2016 | Wei | ....................... | H04B 7/065 |
| 2016/0366626 A1* | 12/2016 | Krishnamoorthy | ........................ | |
| | | | | H04W 36/0085 |
| 2017/0195920 A1* | 7/2017 | Fan | ....................... | H04W 28/10 |

FOREIGN PATENT DOCUMENTS

| | | | | |
|---|---|---|---|---|
| CN | 102036382 A | | 4/2011 | |
| CN | 102291815 A | | 12/2011 | |
| CN | 104185186 A | | 12/2014 | |
| EP | 3610590 B1 | * | 3/2021 | ............. H04L 45/38 |
| WO | 2012138736 A1 | | 10/2012 | |

OTHER PUBLICATIONS

3GPP TSG RAN WG1 meeting #60bis,R1-101774,Design of Relay Frame Timing in LTE-A,CATT, CATR, CMCC, Beijing, China, Apr. 12-16, 2010,total 8 pages.
Xu Ning, Air Interface Evolution of Cellular Mobile Communication Systems: LTE, LTE-A, LTE, Pro, and 5G, Beijing University of Posts and Telecommunications Press, 2018, 1 page (abstract).
Chinese Office Action for Application No. 201880096156.0 dated Dec. 13, 2021, 6 pages.
International Search Report and Written Opinion issued in PCT/CN2018/098941 dated Apr. 17, 2019 9 pages.

* cited by examiner

Downlink timing relationship

DeNB timing: | 11 | 12 | 13 | 0 | 1 | 2 | 3 | 4 | 5 | 6 | 7 | 8 | 9 | 10 | 11 | 12 | 13 | 0 | 1 | 2 | 3 | 4 |

RUE timing: | 11 | 12 | 13 | 0 | 1 | 2 | 3 | 4 | 5 | 6 | 7 | 8 | 9 | 10 | 11 | 12 | 13 | 0 | 1 | 2 | 3 | 4 |

ReNB timing: | 11 | 12 | 13 | 0 | 1 | 2 | 3 | 4 | 5 | 6 | 7 | 8 | 9 | 10 | 11 | 12 | 13 | 0 | 1 | 2 | 3 | 4 |

FIG. 5

Uplink timing relationship

| DeNB timing | 11 | 12 | 13 | 0 | 1 | 2 | 3 | 4 | 5 | 6 | 7 | 8 | 9 | 10 | 11 | 12 | 13 | 0 | 1 | 2 | 3 | 4 |
| RUE timing | 11 | 12 | 13 | 0 | 1 | 2 | 3 | 4 | 5 | 6 | 7 | 8 | 9 | 10 | 11 | 12 | 13 | 0 | 1 | 2 | 3 | 4 |
| ReNB timing | 11 | 12 | 13 | 0 | 1 | 2 | 3 | 4 | 5 | 6 | 7 | 8 | 9 | 10 | 11 | 12 | 13 | 0 | 1 | 2 | 3 | 4 |

METHOD AND APPARATUS FOR REDUCING CO-CHANNEL INTERFERENCE, AND BASE STATION

CROSS-REFERENCE TO RELATED APPLICATIONS

This application is a continuation of International Application No. PCT/CN2018/098941, filed on Aug. 6, 2018. The disclosures of the aforementioned application is hereby incorporated by reference in its entirety.

TECHNICAL FIELD

This application relates to the field of communications technologies, and in particular, to a method and an apparatus for reducing co-channel interference, and a base station.

BACKGROUND

Long term evolution-advanced (Long-Term Evolution-Advanced, LTE-A) is technology evolution driven by the 3rd generation partnership project (3rd Generation Partnership Project, 3GPP) based on LTE technologies to meet a requirement of international mobile telecommunications-advanced (International Mobile Telecommunications Advanced, IMT-Advanced).

An LTE-A system has a high capacity requirement, and such a capacity requires a relatively high frequency band. Therefore, a relay technology is introduced into the LTE-A system to increase coverage and a cell edge throughput. A relay system includes two logical nodes: a donor eNodeB (Donor eNodeB, DeNB) and a relay node (Relay Node, RN). In a relay scenario, the DeNB does not need to directly send data to user equipment (User Equipment, UE), but sends the data to the RN, and then the RN forwards the data to the UE.

The RN is further divided into relay UE (Relay UE, RUE) and a relay eNodeB (Relay eNodeB, ReNB). The RUE has a basic function of standard UE and a relay enhanced function. The RUE may also be referred to as a relay remote node (Relay Remote Node, RRN). The ReNB has all functions of a standard eNodeB and the relay enhanced function. The ReNB may also be referred to as a relay base transceiver station (Relay Base Transceiver Station, ReBTS).

However, when the relay technology is used to increase the cell edge throughput, interference between symbols is also caused when the RUE performs uplink and downlink data transmission with the ReNB.

SUMMARY

Embodiments of this application provide a method and an apparatus for reducing co-channel interference, and a base station, to resolve a prior-art problem of interference between symbols when RUE performs uplink and downlink data transmission with a ReNB.

According to a first aspect, an embodiment of this application provides a method for reducing co-channel interference, including:

receiving, by a relay eNodeB ReNB, a propagation delay sent by a donor eNodeB DeNB, where the propagation delay is a delay of propagation between the DeNB and the ReNB; and adjusting, based on the propagation delay, timing parameters for sending uplink data and receiving downlink data by the ReNB, where the timing parameters are delays of the ReNB relative to the DeNB.

In a possible implementation, the adjusting, based on the propagation delay, timing parameters for sending uplink data and receiving downlink data by the ReNB includes:

delaying timing of receiving the downlink data by the ReNB by a specified time value of receiving downlink data by the DeNB, and advancing timing of sending the uplink data by the ReNB by a specified time value of sending uplink data by the DeNB.

In a possible implementation, the specified time value is the propagation delay.

In a possible implementation, the propagation delay is determined in the following manner:

The DeNB detects and receives an arrival time of a sounding reference signal SRS that is sent by user equipment UE to determine a timing advance TA value, and determines the propagation delay based on the TA value; or the DeNB determines the propagation delay based on a physical distance between the ReNB and relay UE.

According to a second aspect, an embodiment of this application provides an apparatus for reducing co-channel interference, including:

a receiving module, configured to receive a propagation delay sent by a donor eNodeB DeNB, where the propagation delay is a delay of propagation between the DeNB and the ReNB; and an adjustment module, configured to adjust, based on the propagation delay, timing parameters for sending uplink data and receiving downlink data by the ReNB, where the timing parameters are delays of the ReNB relative to the DeNB.

In a possible implementation, the adjustment module is configured to: delay timing of receiving the downlink data by the ReNB by a specified time value of receiving downlink data by the DeNB, and advance timing of sending the uplink data by the ReNB by a specified time value of sending uplink data by the DeNB.

In a possible implementation, the specified time value is the propagation delay.

In a possible implementation, the propagation delay is determined in the following manner:

The DeNB detects and receives an arrival time of a sounding reference signal SRS that is sent by user equipment UE to determine a timing advance TA value, and determines the propagation delay based on the TA value; or the DeNB determines the propagation delay based on a physical distance between the ReNB and relay UE.

According to a third aspect, an embodiment of this application provides a base station, including:

a transceiver, configured to receive a propagation delay sent by a donor eNodeB DeNB, where the propagation delay is a delay of propagation between the DeNB and the ReNB; and a processor, configured to adjust, based on the propagation delay, timing parameters for sending uplink data and receiving downlink data by the ReNB, where the timing parameters are delays of the ReNB relative to the DeNB.

In a possible implementation, the processor is configured to: delay timing of receiving the downlink data by the ReNB by a specified time value of receiving downlink data by the DeNB, and advance timing of sending the uplink data by the ReNB by a specified time value of sending uplink data by the DeNB.

In a possible implementation, the specified time value is the propagation delay.

In a possible implementation, the propagation delay is determined in the following manner:

The DeNB detects and receives an arrival time of a sounding reference signal SRS that is sent by user equipment UE to determine a timing advance TA value, and determines the propagation delay based on the TA value; or the DeNB determines the propagation delay based on a physical distance between the ReNB and relay UE.

According to a fourth aspect, an embodiment of this application provides a computer program product that includes an instruction. When the instruction is run on a computer, the computer is enabled to perform the method according to the first aspect.

According to a fifth aspect, an embodiment of this application provides a computer-readable storage medium, where the computer-readable storage medium stores a computer program, and when the computer program is executed by a processor, the method according to the first aspect is implemented.

According to a sixth aspect, an embodiment of this application provides a base station, including a memory, a processor, and a computer program that is stored in the memory and that can be run on the processor, where the processor executes the computer program to perform the method according to the first aspect.

According to a seventh aspect, an embodiment of this application provides an apparatus, including a processing element and a storage element, where the storage element is configured to store a program, and when the program is invoked by the processing element, the method according to the first aspect is performed.

In the solutions for reducing co-channel interference provided in the embodiments of this application, the DeNB is used as a reference for the propagation delay between the DeNB and the ReNB, to delay the timing of receiving the downlink data by the ReNB to ensure that sending of the downlink data by the ReNB does not interfere with receiving of downlink data by RUE; and advance the timing of sending the uplink data by the ReNB to ensure that sending of the uplink data by the ReNB does not interfere with receiving of uplink data by the RUE.

DESCRIPTION OF EMBODIMENTS

To make the objectives, the technical solutions, and advantages of the embodiments of this application clearer, the following clearly describes the technical solutions in the embodiments of this application with reference to the accompanying drawings and the embodiments in the embodiments of this application.

Figure 1:
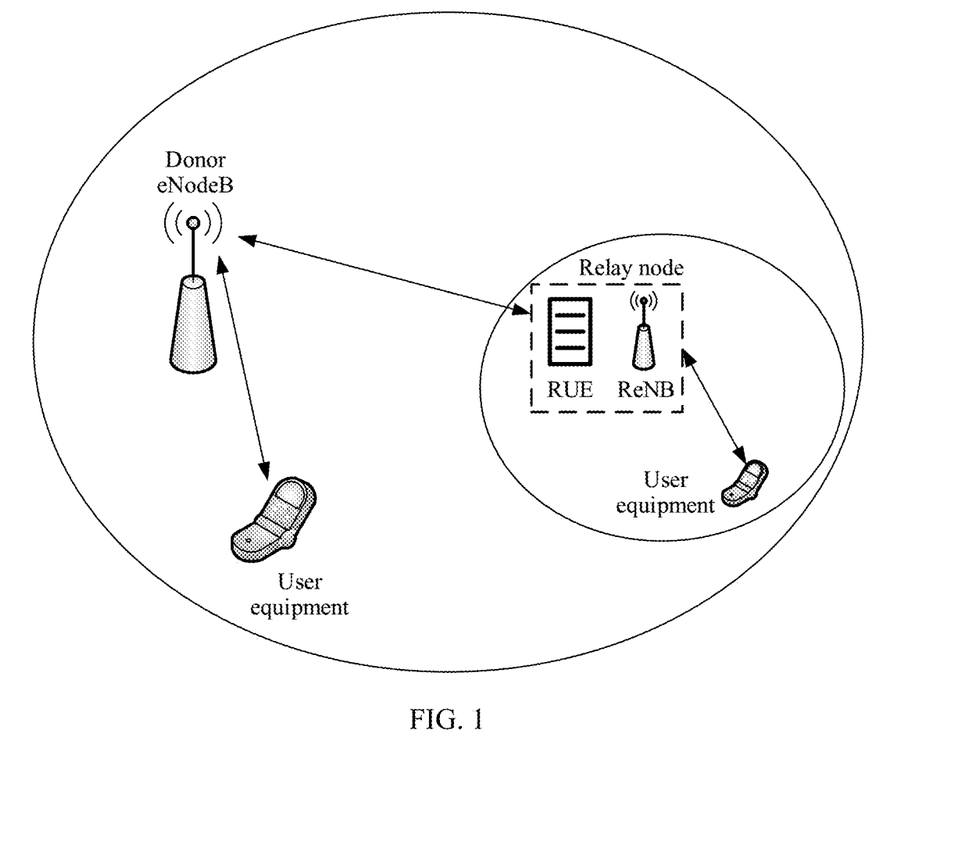
FIG. 1 is a diagram of an application scenario of a method for reducing co-channel interference according to an embodiment of this application.
Figure 2:
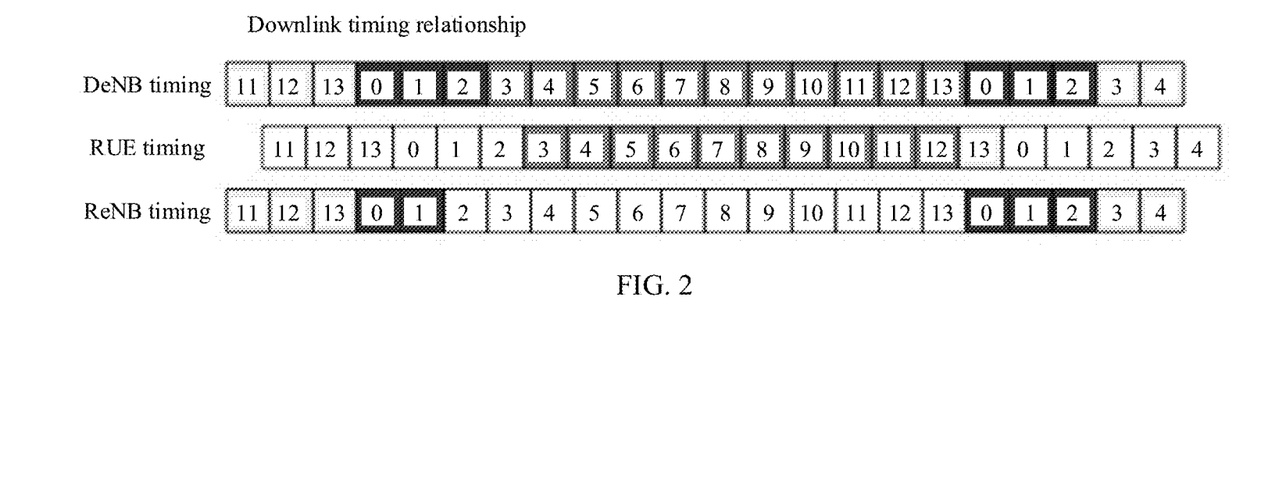
FIG. 2 is a timing relationship diagram of downlink data in a relay scenario in the conventional technology.
Figure 3:
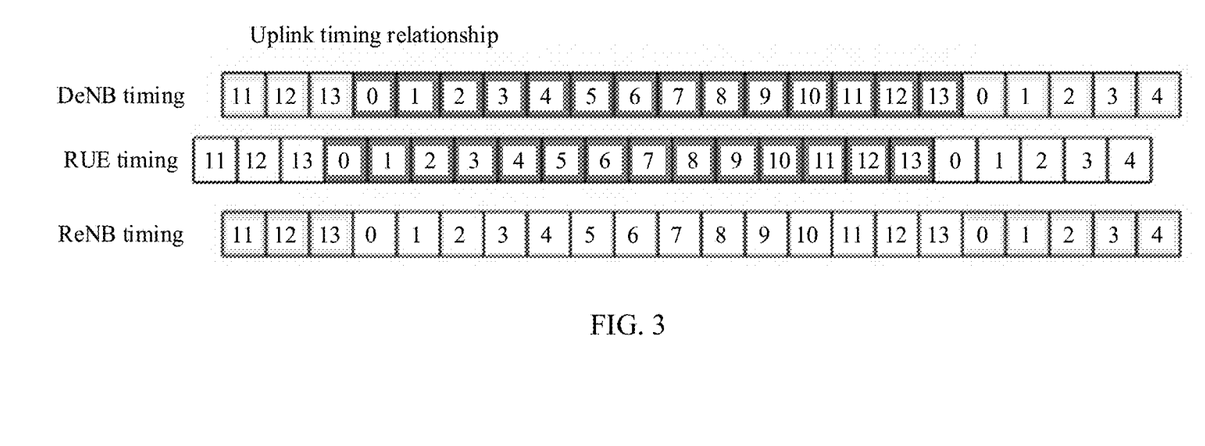
FIG. 3 is a timing relationship diagram of uplink data in a relay scenario in the conventional technology.

FIG. 1 is a diagram of an application scenario of a method for reducing co-channel interference according to an embodiment of this application. As shown in FIG. 1, in the scenario, UE in a range of an RN interacts with a DeNB through the RN, and UE in a range of the DeNB and not in the range of the RN directly interacts with the DeNB. The interaction between the UE in the range of the RN and the DeNB through the RN specifically includes: The UE first establishes a communication connection to a ReNB in the range of the RN. A procedure in which the UE sends uplink data to the DeNB is as follows: The data of the UE is forwarded to the DeNB through the ReNB and RUE. A procedure in which the UE receives downlink data sent by the DeNB is as follows: The DeNB forwards the data to the UE through the RUE and the ReNB. In an entire process of exchanging the uplink data and the downlink data, clocks of the DeNB, the RUE, and the ReNB are in a synchronization state; in this case, co-channel interference may occur between the RUE and the ReNB. To resolve the foregoing problem, an existing solution is to adjust timing of the RUE. Specifically, referring to FIG. 2, because a propagation delay exists between the RUE and the DeNB, the RUE can receive the downlink data of the DeNB only after a relative delay in a downlink of the RUE. In addition, referring to FIG. 3, an uplink of the RUE is adjusted by LTE uplink timing advance (Timing Advance, TA), and an uplink signal is sent in advance. After a propagation delay, the DeNB can receive the uplink signal sent from the RUE.

However, the downlink of the RUE is interfered with by downlink data of the ReNB. To be specific, downlink sending of a symbol 0 in FIG. 2 interferes with downlink receiving of a symbol 13, and when the ReNB receives uplink data of the user equipment in the uplink, the ReNB is interfered with by the uplink data of the RUE, that is, in FIG. 3, a last symbol 13 in a previous subframe of the ReNB is interfered with by uplink data sent by the RUE in a current subframe.

Therefore, due to the propagation delay, interference between symbols cannot be avoided even if a delay of sending the uplink data by the RUE is adjusted to avoid co-channel subframe interference between the RUE and the ReNB.

Figure 4:
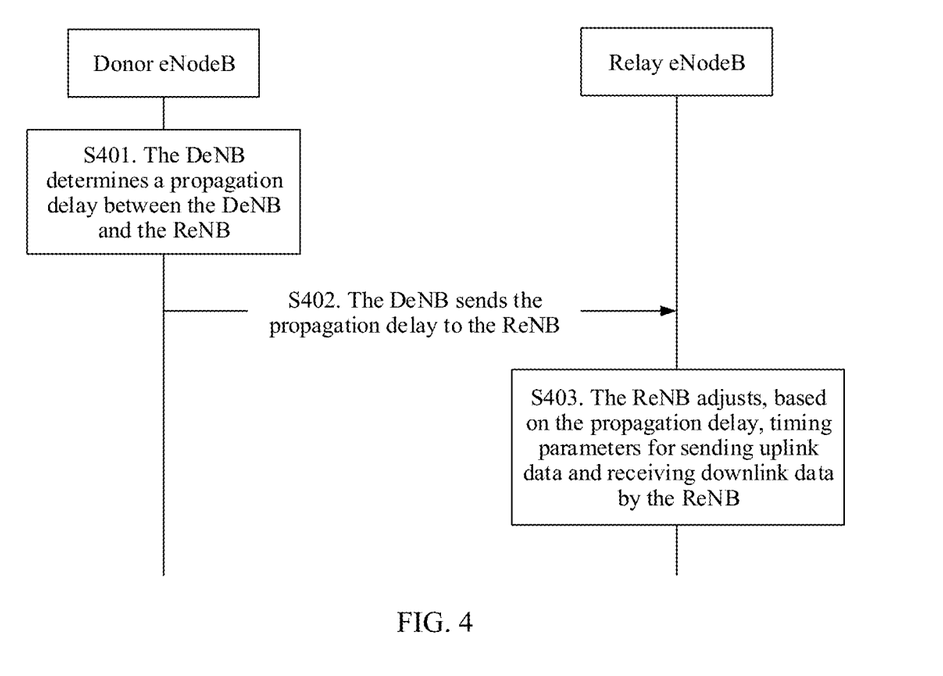
FIG. 4 is a schematic interaction diagram of a method for reducing co-channel interference according to an embodiment of this application.

FIG. 4 is a schematic interaction diagram of a method for reducing co-channel interference according to an embodiment of this application. As shown in FIG. 4, the method includes the following steps.

S401. A DeNB determines a propagation delay between the DeNB and a ReNB.

In this embodiment of this application, the DeNB is used as a reference for the propagation delay between the DeNB and the ReNB, to adjust uplink timing and downlink timing of the ReNB relative to the DeNB, to avoid interference between symbols of RUE and the ReNB.

In an initial state, clocks of the DeNB and the ReNB are synchronized, and the propagation delay between the DeNB and the ReNB may be determined in the following two manners, which specifically include: The DeNB detects and receives an arrival time of a sounding reference signal (sounding reference symbol, SRS) that is sent by UE to determine a timing advance TA value, and determines the propagation delay based on the TA value; or the DeNB determines the propagation delay based on a physical distance between the ReNB and relay UE.

For example, when the RUE initially accesses the DeNB, the DeNB detects, through PRACH measurement, the arrival time of the SRS that is sent by the UE, determines the TA value based on the arrival time, and uses a half of the TA value as the propagation delay ($\Delta t = \frac{1}{2} TA$). In this embodiment, how to determine the propagation delay based on the TA value is described, and the TA value may be set based on an actual requirement. For example, a half or one third of the TA value is used as the propagation delay. This is not specifically limited in this embodiment.

For another example, the DeNB determines the propagation delay ($\Delta t = L/c$) based on the physical distance (L) between the RUE and the ReNB during network planning deployment and a light propagation speed (c).

S402. The DeNB sends the propagation delay to the ReNB.

S403. The ReNB adjusts, based on the propagation delay, timing parameters for sending uplink data and receiving downlink data by the ReNB.

After the ReNB receives the propagation delay sent by the DeNB, the ReNB adjusts, based on the propagation delay, the timing parameters for sending uplink data and receiving downlink data by the ReNB. Timing of receiving the downlink data by the ReNB is delayed by a specified time value of receiving downlink data by the DeNB, and timing of sending the uplink data by the ReNB is advanced by a specified time value of sending uplink data by the DeNB.

Figure 5:
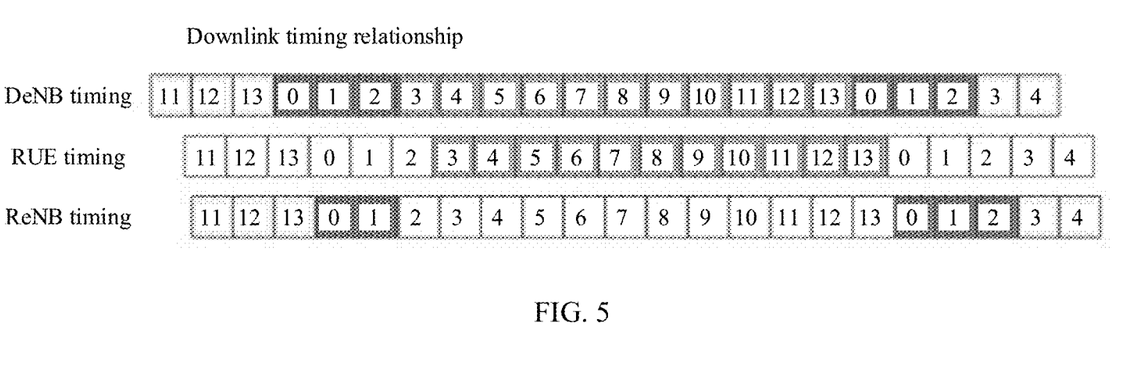
FIG. 5 is a timing relationship diagram of downlink data in a relay scenario according to this application.

FIG. 5 is a timing relationship diagram of downlink data according to this embodiment. For downlink data, the DeNB is used as a reference for the propagation delay between the DeNB and the ReNB, to delay the timing of receiving the downlink data by the ReNB by the specified time value of receiving the downlink data by the DeNB, and the specified time value is the propagation delay ($\Delta t$) between the DeNB and the ReNB. To be specific, when the ReNB and the DeNB receive downlink data at the same time, the downlink data of the ReNB starts to be received after a delay of $\Delta t$ when the DeNB starts to receive the downlink data. The timing of sending the downlink data by the ReNB is delayed, so that interference of downlink sending of a symbol 0 to downlink receiving of a symbol 13 can be avoided.

Figure 6:
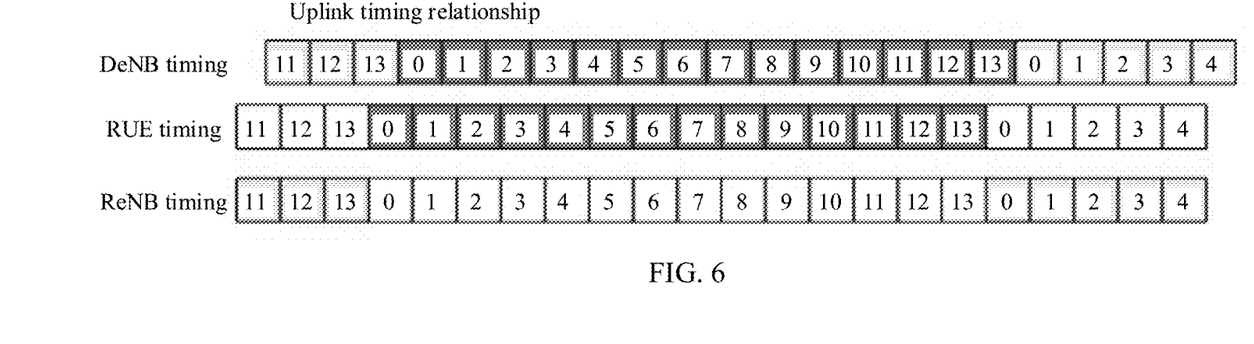
FIG. 6 is a timing relationship diagram of uplink data in a relay scenario according to this application.

FIG. 6 is a timing relationship diagram of uplink data according to this embodiment. For uplink data, the timing of sending the uplink data by the ReNB is advanced by the specified time value of sending uplink data by the DeNB, and the specified time value is the propagation delay ($\Delta t$) between the DeNB and the ReNB. To be specific, when the ReNB and the DeNB send uplink data at the same time, timing of sending the uplink data by the ReNB is $\Delta t$ earlier than timing of sending the uplink data by the DeNB. The timing of receiving the uplink data by the ReNB is advanced, so that a last symbol 13 in a previous subframe of the ReNB is prevented from being interfered with by sending of uplink data by the RUE in a current subframe.

According to the method for reducing co-channel interference provided in this embodiment of this application, the DeNB is used as a reference for the propagation delay between the DeNB and the ReNB, to delay the timing of receiving the downlink data by the ReNB to ensure that sending of the downlink data by the ReNB does not interfere with receiving of the downlink data by the RUE; and advance the timing of sending the uplink data by the ReNB to ensure that sending of the uplink data by the ReNB does not interfere with receiving of the uplink data by the RUE.

Figure 7:
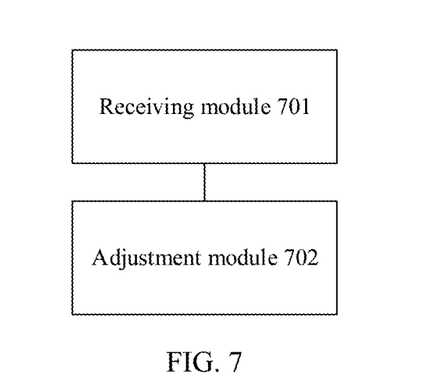
FIG. 7 is a schematic structural diagram of an apparatus for reducing co-channel interference according to an embodiment of this application.

FIG. 7 is a schematic structural diagram of an apparatus for reducing co-channel interference according to an embodiment of this application. As shown in FIG. 7, the apparatus specifically includes:

a receiving module 701, configured to receive a propagation delay sent by a donor eNodeB DeNB, where the propagation delay is a delay of propagation between the DeNB and the ReNB; and an adjustment module 702, configured to adjust, based on the propagation delay, timing parameters for sending uplink data and receiving downlink data by the ReNB, where the timing parameters are delays of the ReNB relative to the DeNB.

Optionally, the adjustment module 702 is configured to: delay timing of receiving the downlink data by the ReNB by a specified time value of receiving downlink data by the DeNB, and advance timing of sending the uplink data by the ReNB by a specified time value of sending uplink data by the DeNB.

Optionally, the specified time value is the propagation delay.

Optionally, the propagation delay is determined in the following manner:

The DeNB detects and receives an arrival time of a sounding reference signal SRS that is sent by user equipment UE to determine a timing advance TA value, and determines the propagation delay based on the TA value; or the DeNB determines the propagation delay based on a physical distance between the ReNB and relay UE.

The apparatus for reducing co-channel interference in this embodiment may perform the method for reducing co-channel interference shown in FIG. 4, and may perform all steps in the method shown in FIG. 4, to achieve the technical effect of the method for reducing co-channel interference. For brevity of description, details are not described herein again.

Figure 8:
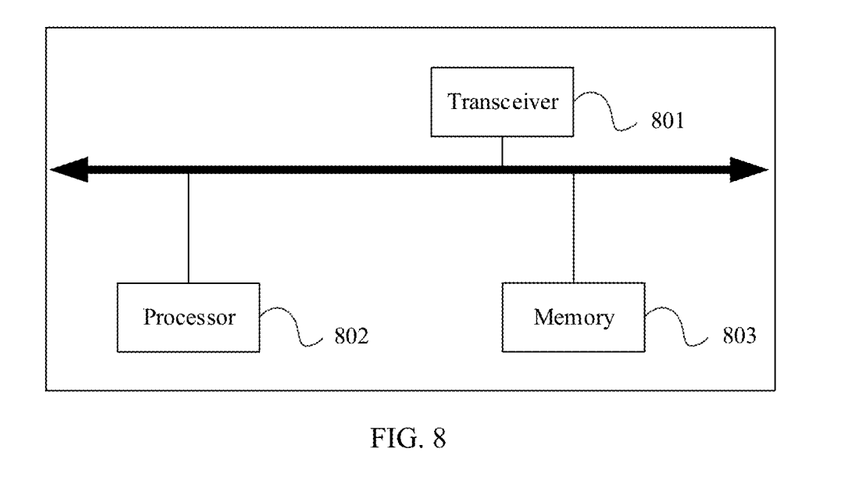
FIG. 8 is a schematic structural diagram of hardware of a base station according to an embodiment of this application.

FIG. 8 is a schematic structural diagram of hardware of a base station according to an embodiment of this application. As shown in FIG. 8, the base station specifically includes a transceiver 801, a processor 802, and a memory 803.

The transceiver 801 may be an antenna.

The processor 802 may be a central processing unit (central processing unit, CPU), or a combination of a CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field-programmable gate array, FPGA), generic array logic (generic array logic, GAL), or a combination thereof.

The memory 803 is configured to store various applications, an operating system, and data. The memory 803 may transmit stored data to the processor 802. The memory 803 may include a volatile memory, for example, a nonvolatile random access memory (nonvolatile random access memory, NVRAM), a phase-change random access memory (phase change RAM, PRAM), or a magnetoresistive random access memory (magnetoresistive RAM, MRAM). The memory 803 may further include a nonvolatile memory, for example, at least one magnetic disk storage device, an electrically erasable programmable read-only memory (electrically erasable programmable read-only memory, EEPROM), a flash memory device such as a NOR flash memory (NOR flash memory) or a NAND flash memory (NAND flash memory), or a semiconductor device such as a solid-state drive (solid state disk, SSD). The memory 803 may further include a combination of the foregoing types of memories.

It may be understood that, the memory 803 may be integrated into the processor 802, or may exist independently.

Working processes of the components are as follows:

The transceiver 801 is configured to receive a propagation delay sent by a donor eNodeB DeNB, where the propagation delay is a delay of propagation between the DeNB and the ReNB.

The processor 802 is configured to adjust, based on the propagation delay, timing parameters for sending uplink data and receiving downlink data by the ReNB, where the timing parameters are delays of the ReNB relative to the DeNB.

Optionally, the processor 802 is configured to: delay timing of receiving the downlink data by the ReNB by a specified time value of receiving downlink data by the DeNB, and advance timing of sending the uplink data by the ReNB by a specified time value of sending uplink data by the DeNB.

Optionally, the processor 802 is configured to configure that the specified time value is the propagation delay.

Optionally, the propagation delay is determined in the following manner:

The DeNB detects and receives an arrival time of a sounding reference signal SRS that is sent by user equipment UE to determine a timing advance TA value, and determines the propagation delay based on the TA value; or the DeNB determines the propagation delay based on a physical distance between the ReNB and relay UE.

The base station in this embodiment may perform the method for reducing co-channel interference shown in FIG. 4, and may perform all steps in the method shown in FIG. 4, to achieve the technical effect of the method for reducing co-channel interference. For brevity of description, details are not described herein again.

A person skilled in the art may be further aware that, in combination with the examples described in the embodiments disclosed in this specification, units and steps may be implemented by electronic hardware, computer software, or a combination thereof. To clearly describe interchangeability between the hardware and the software, compositions and steps of each example have generally been described in the foregoing specification based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

When the integrated unit is implemented in the form of a software function unit and sold or used as an independent product, the integrated unit may be stored in a computer-readable storage medium. Based on such an understanding, all or a part of the technical solutions of this application may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a flash drive, a removable hard disk, a read-only memory (English: read-only memory, ROM), a random access memory (English: random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for reducing co-channel interference, comprising:
receiving, by a relay node comprising a relay user equipment (RUE) and relay eNodeB (ReNB), a propagation delay from a donor eNodeB (DeNB), wherein the propagation delay is a delay of propagation between the DeNB and the ReNB; and
adjusting, based on the propagation delay, timing parameters for: (1) sending, by the RUE to the DeNB, uplink data received from a user equipment (UE), and (2) sending, by the ReNB to the UE, downlink data received from the DeNB, wherein the timing parameters are delays of the ReNB relative to the DeNB.

2. The method according to claim 1, wherein the adjusting comprises:
delaying timing of said sending the downlink data by the ReNB by a specified time value of receiving downlink data sent by the DeNB, and advancing timing of sending the uplink data by the RUE by a specified time value of receiving downlink data sent by the DeNB.

3. The method according to claim 2, wherein the specified time value is the propagation delay.

4. The method according to claim 1, wherein the propagation delay is determined in the following manner:
the DeNB detects and receives an arrival time of a sounding reference signal (SRS) that is sent by the UE to determine a timing advance (TA) value, and determines the propagation delay based on the TA value; or
the DeNB determines the propagation delay based on a physical distance between the ReNB and relay UE.

5. An apparatus for reducing co-channel interference between a relay user equipment (RUE) and a relay eNodeB (ReNB) through which a user equipment (UE) communicates with an donor eNodeB (DeNB), comprising at least one processor and a memory coupled to the at least one processor, the at least one processor being configured to:
receive, a propagation delay from the DeNB, wherein the propagation delay is a delay of propagation between the DeNB and a ReNB; and
adjust, based on the propagation delay, timing parameters for: (1) sending, by the RUE to the DeNB, uplink data received from a user equipment (UE), and (2) sending, by the ReNB to the UE, downlink data received from the DeNB, wherein the timing parameters are delays of the ReNB relative to the DeNB.

6. The apparatus according to claim 5, wherein the at least one processor being further configured to:
delay timing of said sending the downlink data by the ReNB by a specified time value of receiving downlink data sent by the DeNB, and advancing timing of sending the uplink data by the RUE by a specified time value of receiving downlink data sent by the DeNB.

7. The apparatus according to claim 6, wherein the specified time value is the propagation delay.

8. A non-transitory computer-readable storage medium, comprising a program, wherein when being executed by a processor, the following steps are performed:
- receiving, by a relay node comprising a relay user equipment (RUE) and relay eNodeB (ReNB), a propagation delay from a donor eNodeB (DeNB), wherein the propagation delay is a delay of propagation between the DeNB and a ReNB; and
- adjusting, based on the propagation delay, timing parameters for: (1) sending, by the RUE to the DeNB, uplink data received from a user equipment (UE), and (2) sending, by the ReNB to the UE, downlink data received from the DeNB, wherein the timing parameters are delays of the ReNB relative to the DeNB.

9. The non-transitory computer-readable storage medium according to claim 8, wherein the following steps are further performed:
- delaying, timing of said sending the downlink data by the ReNB by a specified time value of receiving downlink data sent by the DeNB, and delaying timing of receiving the downlink data by the RUE by a specified time value of said receiving downlink data sent by the DeNB.

10. The non-transitory computer-readable storage medium according to claim 9, wherein the specified time value is the propagation delay.

* * * * *